United States Patent
Hedley et al.

(10) Patent No.: US 8,756,024 B2
(45) Date of Patent: *Jun. 17, 2014

(54) BUILDING ENERGY CONSUMPTION ANALYSIS SYSTEM

(75) Inventors: Jay Hedley, Arlington, VA (US); Boris Tsypin, Chicago, IL (US); Deepak Raghu, Gurgaon (IN)

(73) Assignee: Accenture Global Services Limited, Dublin (IE)

( * ) Notice: Subject to any disclaimer, the term of this patent is extended or adjusted under 35 U.S.C. 154(b) by 597 days.

This patent is subject to a terminal disclaimer.

(21) Appl. No.: 12/776,159

(22) Filed: May 7, 2010

(65) Prior Publication Data

US 2010/0286937 A1 Nov. 11, 2010

Related U.S. Application Data

(60) Provisional application No. 61/176,855, filed on May 8, 2009, provisional application No. 61/176,790, filed on May 8, 2009.

(51) Int. Cl.
*G01R 19/02* (2006.01)
*G01K 3/02* (2006.01)
*G01K 3/04* (2006.01)
*G01K 13/10* (2006.01)

(52) U.S. Cl.
USPC .............. 702/60; 702/130; 702/132; 702/136

(58) Field of Classification Search
None
See application file for complete search history.

(56) References Cited

U.S. PATENT DOCUMENTS

| | | |
|---|---|---|
| 5,963,458 A | 10/1999 | Cascia |
| 6,785,592 B1 | 8/2004 | Smith et al. |
| 6,816,811 B2 | 11/2004 | Seem |
| 7,228,234 B2 | 6/2007 | McNally et al. |
| 7,778,734 B2 | 8/2010 | Oswald et al. |
| 7,966,104 B2 | 6/2011 | Srivastava et al. |
| 2004/0239494 A1 | 12/2004 | Kennedy et al. |
| 2004/0255601 A1 | 12/2004 | Kwon et al. |

(Continued)

FOREIGN PATENT DOCUMENTS

| | | |
|---|---|---|
| EP | 0924949 | 6/1999 |
| JP | 2009070339 | 4/2009 |
| WO | WO 2007/118128 | 10/2007 |
| WO | WO 2007/139587 A1 | 12/2007 |

OTHER PUBLICATIONS

Sensus—Machine Intelligence, "Energy Monitoring and Reporting" web page, 1p., dated: copyright 2006, obtained from: http://www.sensusmi.com/en/index.php?option=com_content&task=view&id=50&Itemid=82.

(Continued)

*Primary Examiner* — Sujoy Kundu
*Assistant Examiner* — Felix Suarez
(74) *Attorney, Agent, or Firm* — Brinks Gilson & Lione

(57) ABSTRACT

An energy analysis system provides valuable input into building energy expenditures. The system assists with obtaining a detailed view of how energy consumption occurs in a building, what steps may be taken to lower the energy footprint, and executing detailed energy consumption analysis. The analysis may include, as examples, a balance point pair analysis to determine either or both of a heating balance point and a cooling balance point, an exception rank analysis to identify specific data (e.g., energy consumption data) in specific time intervals for further review, or other analysis. The system may display the analysis results on a user interface.

20 Claims, 8 Drawing Sheets

(56) References Cited

U.S. PATENT DOCUMENTS

| | | | |
|---|---|---|---|
| 2006/0161450 A1* | 7/2006 | Carey et al. | 705/1 |
| 2007/0063059 A1 | 3/2007 | Votaw | |
| 2007/0143045 A1 | 6/2007 | Macgregor | |
| 2008/0147465 A1 | 6/2008 | Raines et al. | |
| 2008/0177423 A1 | 7/2008 | Brickfield et al. | |
| 2009/0018884 A1 | 1/2009 | McConnell et al. | |
| 2009/0171862 A1* | 7/2009 | Harrod et al. | 705/412 |
| 2010/0211222 A1 | 8/2010 | Ghosn | |

OTHER PUBLICATIONS

Brian Thompson, "Simple Fault Detection, Diagnosis & Impact Results," 4pp., dated: May 2006, obtained from: http://www.automatedbuildings.com/news/may06/articles/sensus/060427120550sensus.htm.

Brian Thompson, "Service Contractors Profit from the HEAT with Emerging Connectivity and FDDI Analysis," 5pp., dated: Sep. 2006, obtained from: http://www.automatedbuildings.com/news/sep06/articles/sensus/060816105808sensus.htm.

Tridium, Inc., Technical Document, VES Niagara$^{AX}$ User Guide, 164pp., May 28, 2008, obtained from: http://www.hvacc.net/pdf/tridium/docs_3.5.25/VES/VES_AX_UserGuide.pdf.

M. R. Brambley et al., "Advanced Sensors and Controls for Building Applications: Market Assessment and Potential R&D Pathways," 162 pp., dated: Apr. 2005, obtained http://apps1.eere.energy.gov/buildings/publications/pdfs/corporate/pnnl-15149_market_assessment.pdf.

Unknown Author, "Modelling building energy systems—Outdoor environment," 5pp., printed Jun. 29, 2011, obtained from: http://www.esru.strath.ac.uk/Courseware/Building_modelling/sim_theory/out_env.htm.

Hal Levin, "Systematic Evaluation and Assessment of Building Environmental Performance (SEABEP),", 8pp., Submitted for presentation at "Building and Environment," Paris, dated: Jun. 9-12, 1997, obtained from: http://www.buildingecology.net/index_files/publications/SystemicEvaluationandAssessmentSEABEP.pdf.

R. K. Pletzer, et al., "Energy Savings Resulting From Shading Devices on Single-Family Residences in Austin, Texas," 10pp., Proceedings of the Fourth Symposium on Improving Building Systems in Hot and Humid Climates, dated: Sep. 15-16, 1987, obtained from: http://repository.tamu.edu/bitstream/handle/1969.1/6484/ESL-HH-87-09-15.pdf?sequence=3.

David Clayton et al., Building Automation Systems Worldwide Outlook, Market Analysis and Forecast Through 2006, ARC Advisory Group, 145pgs. (Printed 2pgs. Per Sheet—73 sheets).

International Performance Measurement & Verification Protocol, Concepts and Options for Determining Energy and Water Savings, vol. 1, 93 pgs., Mar. 2002.

PCT International Search Report received in International Application No. PCT/US2010/034111, 3pp., dated Jul. 6, 2010.

Singapore Search Report and Written Opinion for Application No. 201108097-5, Mar. 6, 2013.

Ahmed Safwat: "Chapter IV BalancePoint Temperature and the Evaluation of the Building's Thermal Performance Introduction", Jan. 1, 1999, XP055091120, pp. 102-111.

Drury B Crawley et al: "EnergyPlus: A New-Generation Building Energy Simulation Program", Proceedings of Renewable and Advanced Energy Systems for the 21th Century, Nov. 4, 1999, XP055091318, Abstract and pp. 4-13.

Tom Stroozas: "The Balance Point Issue 'Simultaneous Heating & Cooling of Kitchens'", Cooking for Profit, Aug. 15, 2006, XP055091320, pp. 4 and 6.

Raffio G et al: "Targeting residential energy assistance", Jan. 1, 2007. Proceedings of the Energy Sustainability Conference, pp. 489-495. XP009174735, ISBN: 978-0-7918-4797-7, pp. 489-495.

Extended European Search Report for European Patent Application 10 772 910.5-1238, Mailed Dec. 16, 2013.

* cited by examiner

BUILDING ENERGY CONSUMPTION ANALYSIS SYSTEM

CROSS REFERENCE TO RELATED APPLICATIONS

This application claims priority to U.S. provisional patent application Ser. Nos. 61/176,855 and 61/176,790, both filed 8 May 2009 and titled Building Sensor Operational Data Analysis for Energy Saving System Control.

BACKGROUND OF THE INVENTION

1. Technical Field

This disclosure relates to obtaining and analyzing building energy data. This disclosure also relates to engaging in an energy analysis to determine analysis results, and optionally responsively controlling building systems, such as lighting, heating, air-conditioning, and other energy consuming systems.

2. Related Art

Energy consumption, monitoring, and management are crucial components of sustainable, eco-friendly infrastructures now and into the future. In the past, energy monitoring systems, such as those available from Sensus Machine Intelligence, have obtained and analyzed energy data from individual pieces of equipment in a building. A need exists to provide energy data focused analysis results to accurately determine building energy expenditures, performance and costs.

SUMMARY

An energy analysis system provides energy analysis results. The energy analysis system may include a processor, a communication interface coupled to the processor, and a memory coupled to the processor. The memory may include energy analysis logic that, when executed by the processor, causes an energy analysis system to: establish a data connection from a network operations center through an energy data connectivity interface to an energy data source, obtain energy data at the network operations center through the data connection to the energy data source, and perform an energy analysis in the network operations center on the energy data to produce an analysis result.

The energy analysis may include: determining building comparison baseline data within the energy data, determining actual consumption data within the energy data, and determining, as the analysis result, an exception rank by determining a comparison standard deviation of the energy data within a time interval in the building comparison baseline data, and comparing the comparison standard deviation and the actual consumption data. The exception rank may identify specific data in the actual consumption data for further review.

As another example, the energy analysis may include: determining a balance point set from the energy data as the analysis result. The balance point set may include both a heating balance point and a cooling balance point. The system may display any analysis result in a user interface on a display.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The systems and methods may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION

Figure 1:
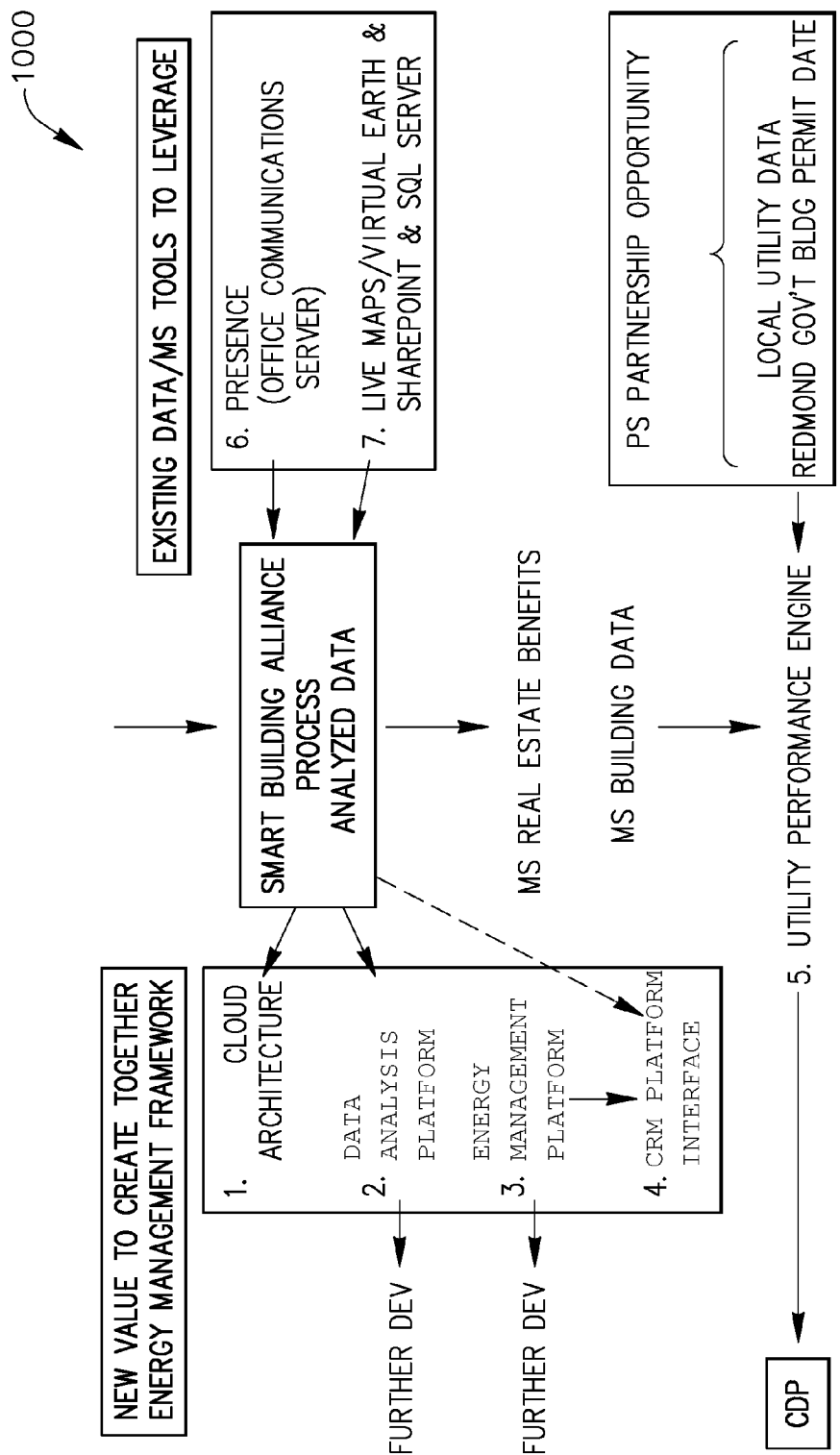
FIG. 1 shows an example of a development framework for a system for building energy analysis.

FIG. 1 shows an example of a development framework 1000 for a system for building energy analysis. The following may be undertaken with regard to developing the system:

Create the strategy and roadmap for co-developing the Energy Management Framework (EMF).

Internally pilot the SMART Buildings platform to be the proving grounds of the EMF and serve as the credential for the EMF and its premier energy management application.

Co-develop the EMF to lead the industry in defining a unique platform to develop, deployed, and manage energy related applications.

Deploy the EMF using, e.g., cloud services OS to manage advanced engineering calculations and data management requirements.

Investigate leading technologies for building system connectivity and integration and help scale additional drivers, scalability, and security with a platform for any company to leverage.

Further define the strategy of the EMF to leverage additional technologies as the market develops.

Integrate into existing Energy systems and technologies.

Align with utility companies to leverage specific solutions as part of the world's energy/carbon dashboards (SMART Grid, INDE, demand response programs, carbon tracking/management/trading, SMART City).

Figure 2A:
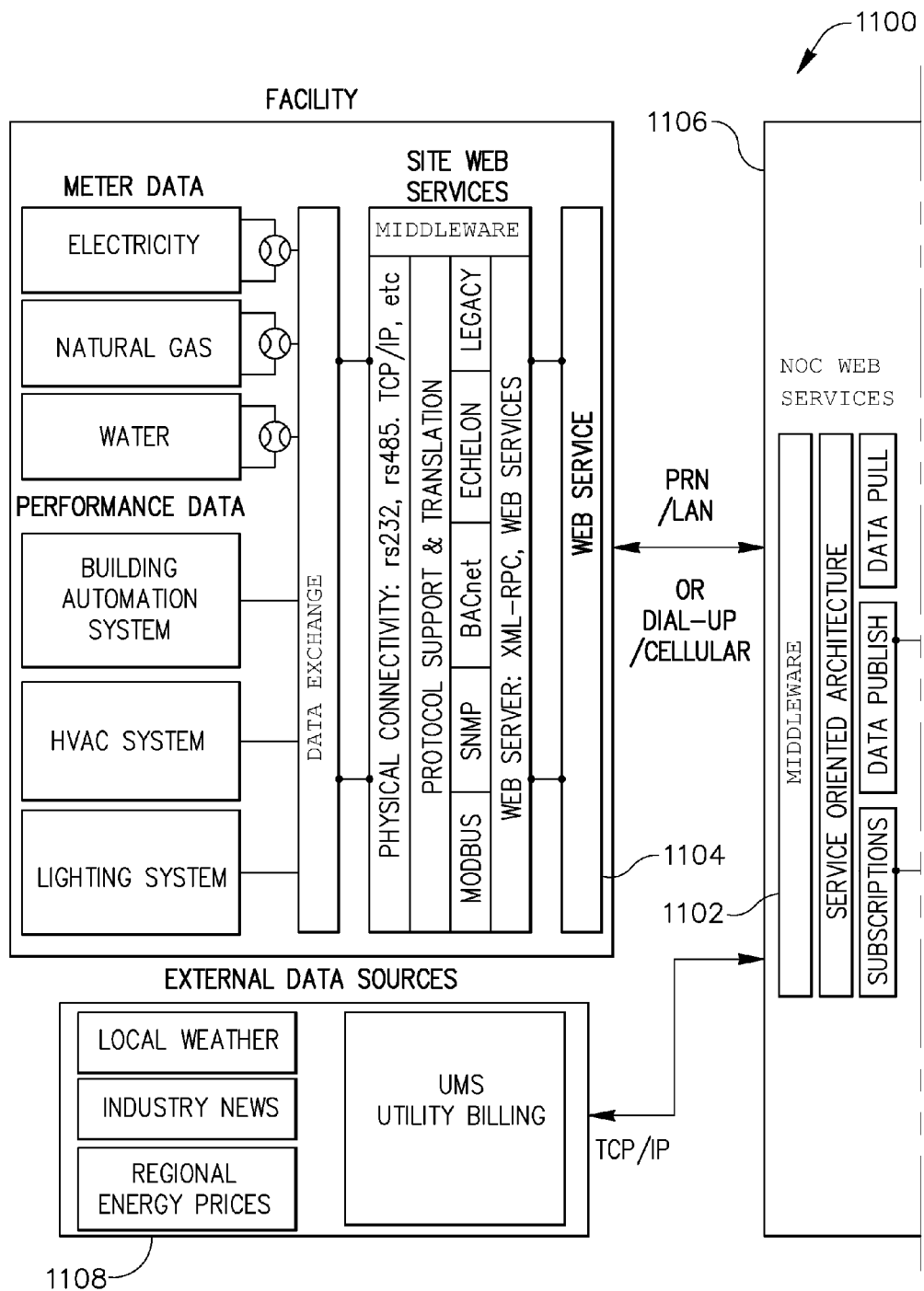
FIGS. 2A and 2B show a system architecture for building energy analysis.
Figure 2B:
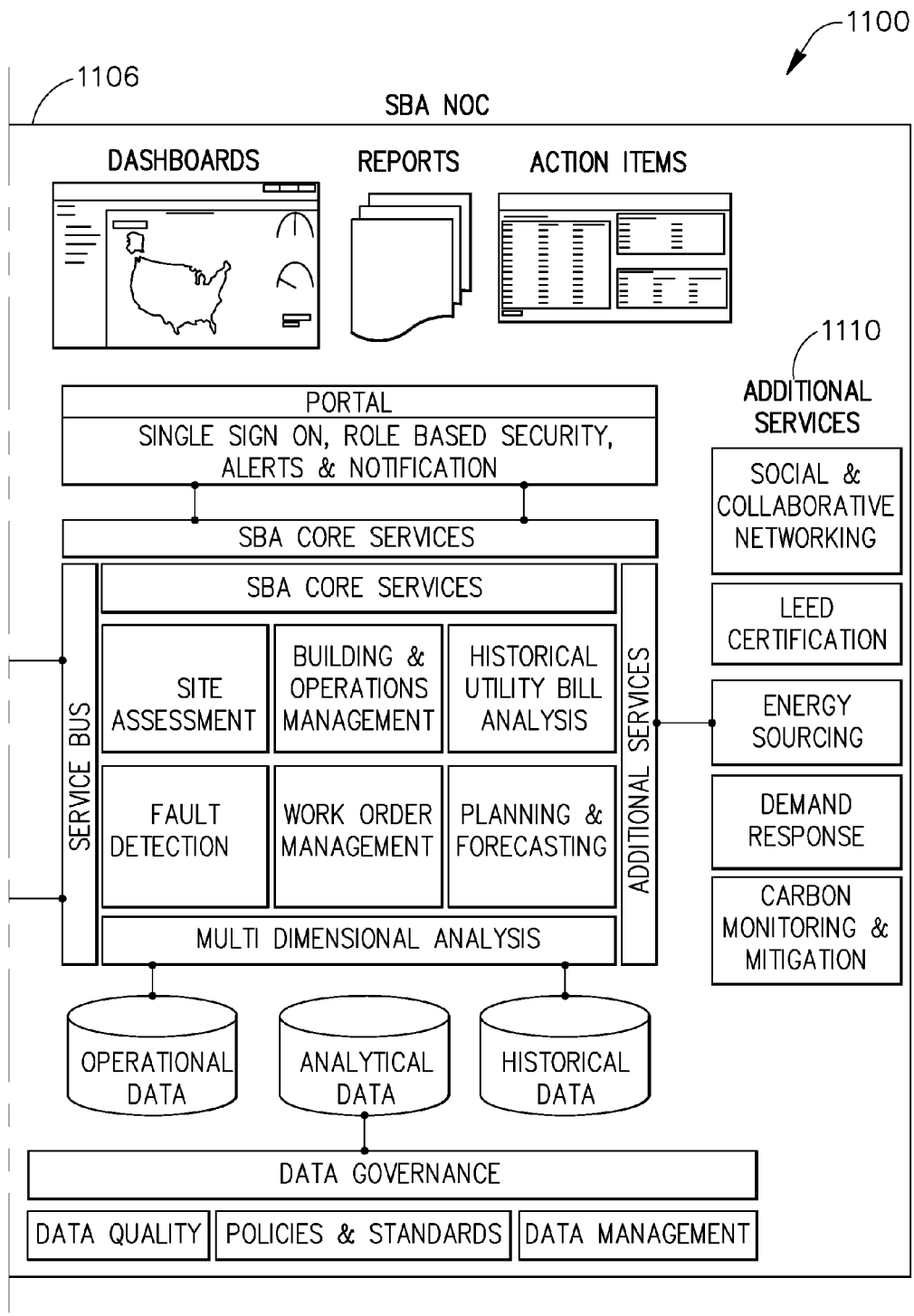

FIGS. 2A and 2B show an architecture 1100 for the system. The system may provide an energy data focused approach based on data management and analytics of existing systems and equipment versus a capital intensive approach. The system may connect and integrate in a hardware and software agnostic way with multiple vendor solutions & protocols. The system may provide an open IP-based two way (read/write) infrastructure connecting one or more buildings in a portfolio to a network operations center with web-based control capabilities. The system may, as examples:

1) deliver continuous re-commissioning through setpoint control and schedule optimization;

2) deliver 24 hours a day×7 days a week (24×7) automated equipment fault detection and diagnosis down to one-minute intervals and prioritized by user defined options: rank, severity, cost of fault, location, and others;

3) establish operational guidelines for setpoints and schedules across all equipment and BAS data for a portfolio of buildings, managed through a central command center;

4) deliver measurable calculated monthly results tracking energy reductions: (10% min in year 1);

5) integrate to existing Maintenance Repair & Operations applications and Energy Management systems;

6) include the ability to install, connect, and integrate additional meters, sub-meters, sensors into the common platform as required;

7) be supported by world class project management, change management, and training organization; and 8) be delivered on a scalable architecture to easily and securely scale with the client's needs.

With reference still to FIGS. 2A and 2B, the architecture 1000 includes:

At the building (e.g., company facility): middleware 1102 provides a connectivity interface for connecting to one or more meters and sub-systems in a facility. The meters may include utility meters as well as any Building Automation System (BAS), lighting or security control system, or other systems.

Site Web Services 1104: The middleware 1102 communicates the data it collects to the System Network Operations Center (NOC) 1106. The middleware 1102 may received the energy data from web services 1104 installed onsite at any desired facilities. In other words, the web services 1104 may establish a data connection to the middleware 1102 and send building energy data to the middleware 1102. However, any other type of connectivity interface as a data transmission mechanism may be employed to communicate data to the middleware 1102, including file transfer, message passing (whether web services based or not), shared memories, or other data transfer mechanisms.

System NOC 1106: The NOC 1106 may use a Service-Oriented Architecture (SOA) to aggregate data across all facilities. Its core services provide analytics and other data management services to the user via a Web-based portal, or Rich Internet Application (RIA). Examples of the specific implementation of the NOC 1106 and the analysis results that the NOC 1106 may provide are discussed below, and in particular with regard to FIGS. 3-6.

External Data sources 1108: In addition, the NOC collects relevant data from external data sources, such as the National Weather Service, and may also obtain reports on regional energy prices and 3rd-party or company systems.

Additional Services 1110: Because of the versatility of the system 100 infrastructure, additional services may be layered onto the core. The middleware 1102 has 2-way communication that supports Demand Response programs. Additional services also include a collaborative social network in which company facility managers and operators can share information on operations. They may also drive LEED certification of company buildings, perform carbon tracking and mitigation services, and others.

The system energy management data services offer a unique approach at delivering a comprehensive view of a facility's operations. The system may implement continuous optimized control through real time/interval data acquisition and analysis of all relevant facility data. The System Enterprise Energy Management System (EEMS) may include or involve: (1) a physical site assessment, (2) historical utility bill analysis, (3) utility meter interval data analysis, (4) holistic facility controls analysis, (5) real-time automated equipment fault detection and (6) energy sourcing and demand-response energy management. From these inputs the System energy management system generates insight in the form of reports, dashboards, and alerts that provide actionable information that leads to realized energy reduction and cost savings.

The system may begin with a detailed audit of the facility premises. Facilities are surveyed to fully document machine type, layout and building structure, operating hours, building automation capabilities and potential need for additional metering and sub-metering. Specific care is given to observe the unique properties of each building. The walkthrough provides critical baseline information on the premises' layout, engineering, and operational health.

Historical utility bill analysis is the next phase of the system implementation. The historical utility bill analysis provides an in-depth look at utility bill trends over time, including general or seasonal trends energy trends. This information is crucial to understanding the way a building has been operating so energy saving opportunities can be recognized. It also provides a benchmark against which later energy saving measures can be compared. Additionally, it is common to find billing errors during this phase, which are immediate opportunities for savings.

Meter interval data analysis is a third phase of the system solution. To obtain data about energy consumption, an energy data middleware 1102 is installed and connected to on-site utility meters. The middleware 1102 is used to collect utility data from each of the meters and sub-meters in a building, including the building automation system. This data is then cleansed and collected to get a consumption breakdown by building, section or floor and can be viewed in the robust EEMS tool. Much like the billing analysis, this information is used to spot trends and benchmark future energy saving strategies.

The middleware 1102 extracts data from each building system and piece of equipment in the building. This data is tracked over time to observe subtle features in the way the equipment works and the building operates as a whole. As months and even years of data are collected, macro-scale trends related to seasonality, occupancy, and utilization rates all emerge. These trends help contextualize power usage and other metrics, allowing for even greater insight into building operations and further opportunities for savings.

The system solution utilizes data captured by the middleware 1102 on a per-minute basis. This fine level of granularity facilitates the System solution to identify real-time trends and problems which were previously undetectable. Additionally, it provides real-time actionable reporting that prioritizes problems and suggests a tangible cost to their continued neglect or systematic inefficiencies. Automatic fault detection begins with as little as three weeks of collected data, and continues for the life of the System contract.

The middleware 1102 provides for bi-directional (read/write) capability with any integrated system. This facilitates for 24/7 continuous optimized control of the systems connected to it. The middleware 1102 has an intelligence layer allowing for full closed loop advanced math and logic between any of the previously disparate systems. The middleware 1102 also sends and consumes Web services. An example Web service would be an Automated Demand Response (ADR) notice and pricing level signal from Constellation New Energy (CNE) triggering the middleware 1102 on board logic and control to automatically shed electrical loads by turning off non essential lighting and changing set points on chilled water and HVAC zones.

Thus, the system and NOC 1106 may establish a data connection from the network operations center 1106 through an energy data middleware 1102 to an energy data source 1104. They may then obtain energy data at the network operations center 1106 through the data connection to the energy data source 1104. The system and NOC 1106 may also perform an energy analysis in the network operations center 1106 on the energy data to produce an analysis result, as described below, for example in connection with FIGS. 3-6.

Another component of the system solution is the strategic energy sourcing and demand-response energy planning. Energy sourcing experts will help each facility to find the lowest cost and/or greenest power available in that market. Green options include offsetting a facility's energy requirements with renewable sources of energy, including wind, small hydroelectric, landfill gas, and biomass, providing an electricity choice that can directly support the building of new renewable power plants. The system demand response solution is an additional service that can provide direct revenue to a facility. Facilities sign up with the regional ISO's demand response program and receive annual payment for participation, in exchange for agreeing to shed load an agreed number of times. System helps to engineer a demand response solution that minimizes impact on facility operations. Both energy sourcing and demand response are administered to meet regional regulations while delivering value to the customer.

The system solution achieves cost savings on several fronts. Most notably, savings are realized through reductions in total energy consumption and decreases in both scheduled and unscheduled maintenance.

Energy savings occur when building control sequences are optimized to run in the most economic fashion. Wasteful situations like running an unoccupied building at/near full capacity are easily eliminated. More subtle improvements can be identified through system analytic solutions which identify mis-configured and even machines needing repairs. The system solution's automatic fault detection and diagnosis tool not only provides a clear understanding of a problem, but suggests a financial consequence with letting the problem go unresolved. The EEMS' reporting gives a level of detail which requires less man-hours to investigate—freeing the facility team to address the most promising energy saving opportunities rather than simply assessing the state of the building.

Efficient building operations leads to decreases in scheduled maintenance costs. This increases the lifespan of the equipment and decreasing the replacement frequency, thus allowing a facility to optimize its operations with the equipment it has, rather than recommending new capital purchases. Unscheduled maintenance costs also decrease based on detection of inefficient machines. Some machines may achieve the desired end result (say, cooling a room to 72 degrees), but do so in a highly inefficient manner which cuts its lifespan by as much as half. As an example, a machine which is operating in both heating and cooling mode may be able to achieve a final temperature of 72 degrees by mixing hot and cold air. However, this is highly inefficient and could cause the machine to break unexpectedly.

Altogether, the system solution provides direct, continuous, and reliable energy savings without requiring major capital purchases. The system solution helps a facility makes the best use of the equipment it already has, by optimizing energy consumption and maximizing the lifespan of the equipment. Through its data-driven solution, the system provides an approach that is unique in the marketplace for bringing an information-technology-driven business intelligence capability to the world of facility energy management.

Figure 3:
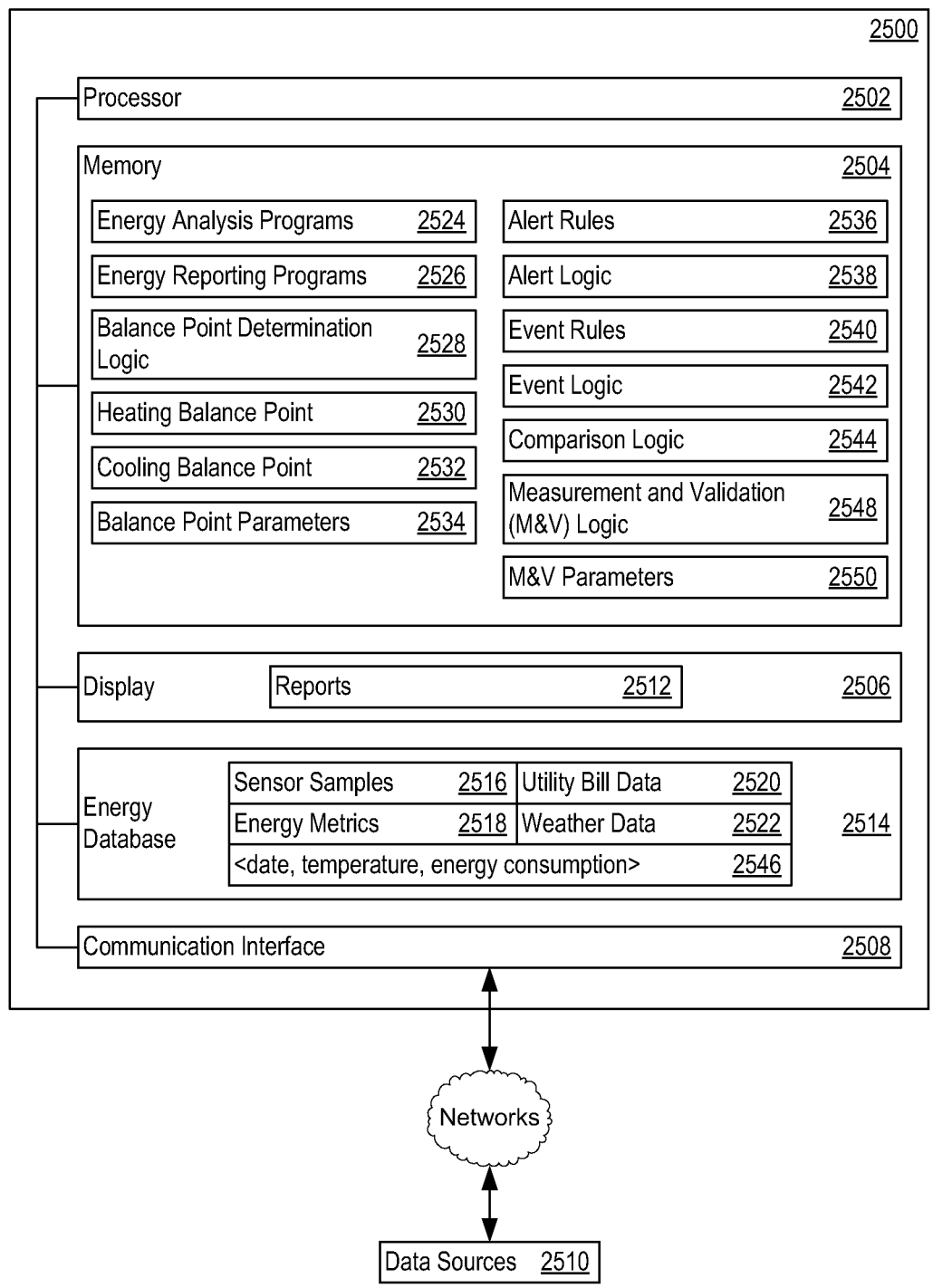
FIG. 3 shows an example of a particular machine for implementing the system for building energy analysis.

FIG. 3 shows one example of a particular machine 2500 that implements a system for building energy analysis. The machine 2500 may implement all or part of the network operations center 1106, for example. The machine 2500 includes a processor 2502, a memory 2504, and a display 2506. A communication interface 2508 connects the machine 2500 to energy data sources 2510, such as building sensors, utility company meters, weather centers, mediator devices (e.g., a Richards-Zeta Mediator), and other data sources. The display 2506 may present reports 2512, such as those described above or below, either locally or remotely to an operator interacting with the machine 2500.

The machine 2500 also includes an energy database 2514. The energy database 2514 may store any data that the machine 2500 processes. As examples, the energy database 2514 may store sensor samples 2516 (e.g., samples of energy consumption or performance of building energy consuming devices), energy metrics 2518 (e.g., measured or computed metrics, optionally based on energy KPIs), utility bill data 2520 (e.g., cost per unit energy, energy consumed, total cost, and date), weather data 2522 (e.g., temperature ranges, dates, expected temperature or temperature variations at any desired interval), or other data that helps the machine 2500 analyze energy consumption, cost, or history.

The memory 2504 may store program instructions or other logic for execution by the processor 2502. For example, the memory 2504 may store energy analysis programs 2524 and energy reporting programs 2526. The energy analysis programs 2524 may gather, analyze, and otherwise process the sensor samples 2516 or other energy data (e.g., to produce control recommendations for building systems or identify data points for further study and analysis). The energy reporting programs 2526 may generate user interfaces including dashboards, charts, graphs, text displays, or other reporting information.

The machine 2500 may perform an energy analysis (e.g., as part of the network operations center) on the energy data in the energy database 2514 to produce an analysis result. To that end, as one example, the machine 2500 may include in the memory 2504 balance point determination logic 2528 (e.g., as one of the energy analysis programs 2524). The balance point determination logic 2528 may search for one balance point, or a set of multiple balance points (e.g., a pair of balance points) in the energy data. In one implementation, the energy data that is searched are triples of: date, temperature, and measured consumption data 2546, obtained from one or more energy data sources over any desired date range, such as from a building under analysis and a weather information center.

The balance points may include a Heating Balance Point (HBP) 2530 and a Cooling Balance Point (CBP) 2532 to help identify the number of heating degree days (HDDs) and cooling degree days (CDDs). The HBP 2530 may be interpreted as the temperature above which the building is not heating, while the CBP 2532 may be interpreted as the temperature below which the building is not cooling. In one model, the building is neither heating nor cooling between the HBP 2530 and the CBP 2532. Thus, identifying both the HBP 2530 and CBP 2532 may significantly increase the accuracy of the count of the number of HDDs and CDDs for the building, particularly as compared to finding a single balance point for both heating and cooling, or compared to assuming a standard and usually inaccurate balance point (e.g., 65 degrees F.). The increased accuracy in the determination of HDDs and CDDs has positive effects in downstream technical analyses, such as obtaining a more accurate determination of the weather load on the building, and therefore a more accurate regression model of how the building responds to weather load. The more accurate regression model means more accurate measurement and verification of savings obtained when energy management strategies are implemented based on the downstream analyses.

Figure 4:
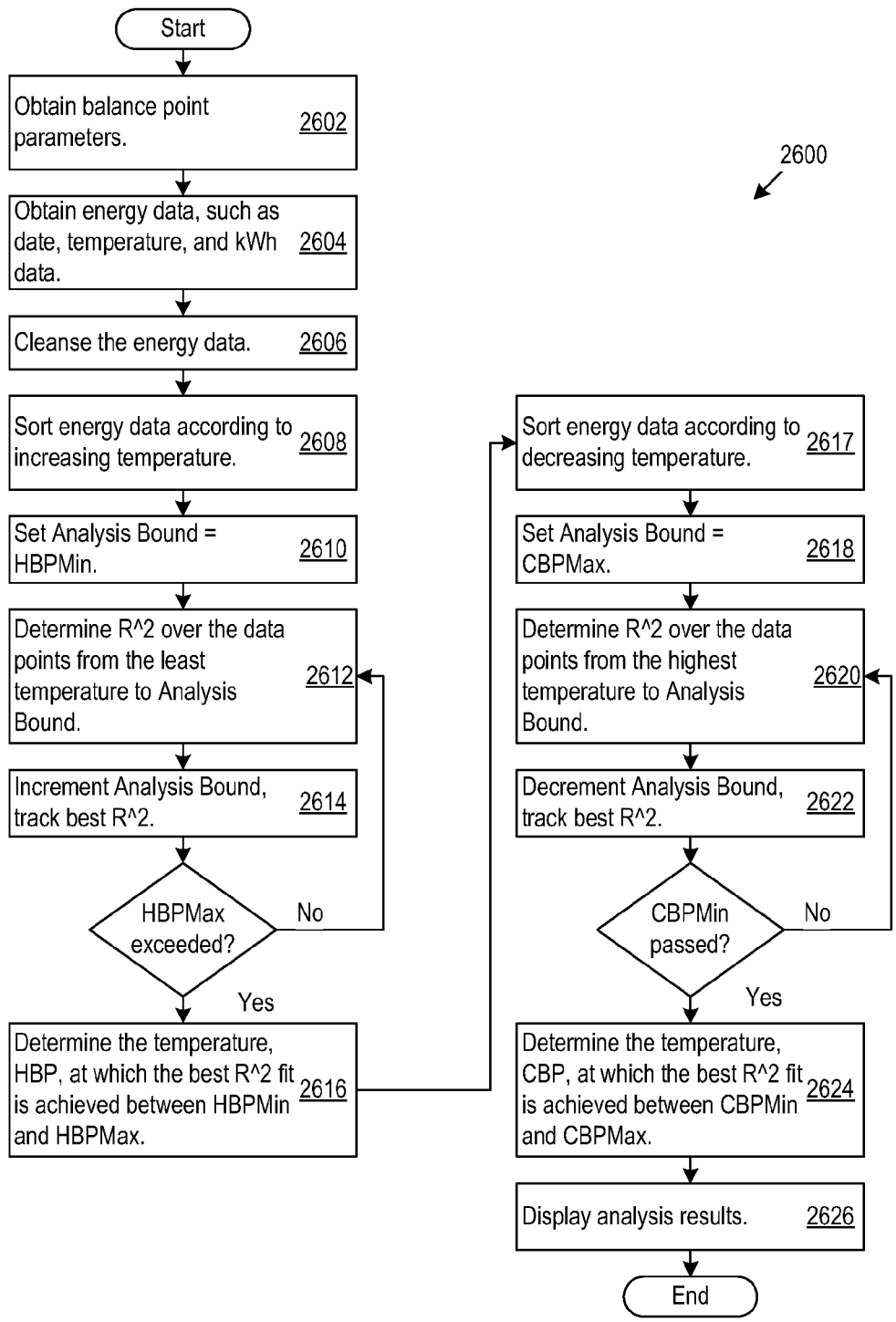
FIG. 4 shows balance point determination logic.

In particular, the balance point determination logic 2528 may implement the logic 2600 shown in FIG. 4. The logic 2600 may be implemented as executable instructions for the processor 2502, to determine either or both of a HBP 2530 and a CBP 2532 (i.e., as a computer implemented method). The balance point determination logic 2528 may obtain (2602) balance point parameters 2534 including, as examples, those shown below in Table Balance Point Parameters.

The balance point determination logic 2528 may obtain the balance point parameters 2534 from operator input, from pre-defined parameters stored in the memory 2504, or in other ways. With regard to the search window parameters, alternatively the balance point determination logic 2528 may search for the HBP 2530 and CBP 2532 over the entire temperature range (or some pre-defined portion of the whole range) represented in the energy data obtained for analysis.

TABLE

Balance Point Parameters

| Parameter | Comment |
| --- | --- |
| HBPMin | The lower end of the search window for the heating balance point, e.g., in degrees F. or C. |
| HBPMax | The upper end of the search window for the heating balance point, e.g., in degrees F. or C. |
| CBPMin | The lower end of the search window for the cooling balance point, e.g., in degrees F. or C. |
| CBPMax | The upper end of the search window for the cooling balance point, e.g., in degrees F. or C. |
| R^2Min | The minimum correlation coefficient value that the balance point determination logic 2528 will consider in its search for a HBP or CBP. Thus, R^2 values below R^2Min may be discarded or not considered in the search for the best fit R^2 in the analysis discussed below. In other implementations, the balance point determination logic 2528 may employ additional or different statistical tests or variables to determine which regression models to consider in its search for the HBP and CBP. Alternatively, all R^2 values may be considered. |
| Temperature Delta | A temperature increment (for the HBP) or decrement (for the CBP) that defines the number or size of steps through the heating balance point search window or cooling balance point search window. For example: an increment of 2 degrees and a decrement of 3 degrees, or an increment and a decrement of 1 degree. |
| Data Cleansing Parameters | Parameters used to identify and remove outlier data points in the energy data before searching for the HBP or CBP. For example, a number (e.g., 1.5) of standard deviations from the mean temperature or mean energy consumption that defines outlier data points in temperature or energy consumption to be removed. |

The balance point determination logic 2528 obtains energy data from the building under analysis (2604). As an example, the energy data may include date, temperature, and energy consumption (e.g., kWh) data for each date. The energy data may instead be kBTU consumption, occupancy, wind speed, relative humidity, or other energy data. The energy data may extend over any desired time period, such as one year, one quarter, or one month, and may be collected at any desired interval (e.g., every 15 minutes, 30 minutes, 60 minutes, or other interval), with the data subjected to any desired mathematical treatment (e.g., averaging of the data, or discarding outlier data) to obtain the energy data for a given date.

The balance point determination logic 2528 optionally cleanses the energy data prior to analysis (2606). For example, the balance point determination logic 2528 may remove from consideration from the energy data: weekend data points, outlier data points, data points with errors in date or energy consumption data, or other non-representative data points. The outlier data points may be data points beyond a predefined outlier threshold (e.g., 2 standard deviations away from the mean) input as a balance point parameter. More specifically, the outlier data points may be determined by finding the average and standard deviation of the input data (e.g., the average of weekdays after data with invalid dates and energy data are discarded), then removing data points more than a pre-defined or operator specified multiple of the standard deviation away from the average).

Given the input energy data, the balance point determination logic 2528 performs an analysis (e.g., a regression analysis) to determine a balance point set. The balance point set may include the HBP 2530 and the CBP 2532, as an example. One exemplary analysis is described below with continued reference to FIG. 4. In the example given below, the balance point determination logic 2528 uses regression analysis to determine $R^2$ values. However, it is noted that the balance point determination logic 2528 may apply additional or different statistical tests or variables in its search of the energy data to find the HBP 2530 and CBP 2532.

In particular, the balance point determination logic 2528 sorts the energy data according to temperature (e.g., in ascending order) (2608). An analysis bound, for finding the HBP 2530, is initially set to HBPMin (2610). For all the data points starting from the least temperature to the data point corresponding to HBPMin, the balance point determination logic 2528 determines the square of the correlation coefficient, $R^2$, between temperature and energy consumption for that set of data points (2612). The balance point determination logic 2528 may determine the correlation coefficient by, in general, performing a linear regression using the least squares method, with 'n' independent variables and one dependent variable. The balance point determination logic 2528 then increments the analysis bound (e.g., by 1 degree, or another pre-defined temperature delta) and if HBPMax has not yet been exceeded, the balance point determination logic 2528 determines the square of the correlation coefficient, $R^2$, between temperature and energy consumption for all data points from the least temperature to the incremented analysis bound. This way, the balance point determination logic 2528 returns to (2612) repeatedly to determine the next $R^2$ over the new set of data points extending to the incremented analysis bound until the incremented analysis bound reaches HBPMax. The balance point determination logic 2528 may save, display, analyze, plot or otherwise manipulate any or all of the $R^2$ values determined during the analysis. Once the balance point determination logic 2528 has determined the $R^2$ values at each increment delta over the window between HBPMin to HBPMax, the balance point determination logic 2528 determines the temperature at which the best $R^2$ fit is achieved (2616), e.g., as determined by the greatest $R^2$ value. That temperature is designated the HBP 2530.

With regard to the CBP 2532, the balance point determination logic sorts the energy data according to decreasing temperature (2617) and sets a new analysis bound equal to CBPMax (2618). For the data points starting from the highest temperature to the data point corresponding to CBPMax, the balance point determination logic 2528 determines the square of the correlation coefficient, $R^2$, between temperature and energy consumption, for that set of data points (2620). The balance point determination logic 2528 then decrements the analysis bound (e.g., by 1 degree, or another pre-defined temperature delta) and if CBPMin has not yet been reached, the balance point determination logic 2528 determines the square of the correlation coefficient, $R^2$, between temperature and energy consumption for all data points from the highest temperature to the decremented analysis bound. This way, the balance point determination logic 2528 returns to (2620) repeatedly to determine the next $R^2$ over the new set of data points extending to the decremented analysis bound until the decremented analysis bound reaches CBPMin. The balance point determination logic 2528 may save, display, analyze, plot or otherwise manipulate any or all of the $R^2$ values determined during the analysis. Once the balance point determination logic 2528 has determined the $R^2$ values at each decrement delta over the window between CBPMmax to CBPMin, the balance point determination logic 2528 determines the temperature at which the best $R^2$ fit is achieved (2624), e.g., as determined by the greatest $R^2$ value. That temperature is designated the CBP 2530. The HBP and CBP may be displayed, saved, or otherwise manipulated (2626).

Obtaining the balance point parameters noted above helps to focus the search for the balance points in specific windows. The results are faster and more efficient searches for the balance points. An exhaustive search of all the data points may still be performed, however, and in that regard, the balance point determination logic 2528 need not obtain specific balance point search window parameters before performing its analysis Once the balance point determination logic 2528 has obtained the HBP 2530 and CBP 2532, the machine 2500 may apply the HBP 2530 and CBP 2532 in many different types of analyses and reporting. For example, the measurement and verification (M&V) logic 2548 (or the balance point determination logic 2528) may calculate the number of HDD and CDD, present analysis plots on the display 2506, or take other actions. For example, the M&V logic 2548 may: plot the CBPMin to CBPMax with corresponding $R^2$; plot the HBPMin to HBPMax with corresponding $R^2$; determine whether any day was a CDD according to the CDD test: Min(Temperature recorded that day−CBP, 0) that returns non-zero for a CDD; determine whether any day was a HDD according to the HDD test: Min(HBP−Temperature recorded that day, 0) that returns non-zero for a HDD; extract the month from the date field for each data point (row) and sum the kWh consumption, kBTU consumption, CDD, HDD and the number of days in the data set belonging to each month and store or display the monthly figures; for monthly CDD and HDD, calculate Log CDD, Log HDD, $CDD^2$, $HDD^2$ and store or display the values for each month; for each month, calculate average Occupancy, Relative Humidity, Wind Speed, Global Solar Radiation and store or display these for each month; or output other analysis result.

The M&V logic 2548 may define, execute, and display the results of regression analyses, given, as examples, the number of CDD or HDD, the HBP 2530 or CBP 2532, or other parameters. To that end, the M&V logic 2548 may obtain (e.g., from operator input or from pre-defined parameters in the memory 2504) M&V parameters 2550. The M&V parameters 2550 may include, as examples, company name, building name, an (optionally) unique building identifier, analysis start date, analysis end date, or other parameters. Additional M&V parameters 2550 may include: user-specified independent variables for use in regression analyses, such as CDD, HDD, number of days, $CDD^2$, $HDD^2$, Log CDD, Log HDD, occupancy, relative humidity, wind speed, and global solar radiation; and user-specified dependent variables for use in the regression analyses, such as kWh consumption, kBTU (i.e., natural gas) consumption. Using the M&V parameters 2550, the M&V logic 2548 may calculate, store, display or otherwise perform a user-specified regression analysis. In particular, the M&V logic 2548 may determine the 'n' independent variables specified in the M&V parameters 2550, and from 'i'=1 to n, take 'i' of the variables at a time and create a regression model with the 'i' variables as independent variables and kWh (or kBTU, or other energy measurement chosen) as the dependent variable. Each of the regression models created may use a combination (subset) of the overall 'n' independent variables chosen. The M&V logic 2548 runs the regression based on the data (e.g., monthly, weekly, or daily data) for the dependent and independent variables, and may determine and store the $R^2$ value, significance F (e.g., from an F-test), or any other variables or test results, and the corresponding intercept and coefficient values for each of the 'i' independent variables.

The M&V logic 2548 may, if desired, for each independent variable chosen, disallow the certain pairs of variables in the regression analysis (e.g., transformations of the same variable may not be chosen together in the same regression model). As examples:

CDD and $CDD^2$ together may be disallowed;
CDD and Log CDD together may be disallowed;
Log CDD and $CDD^2$ together may be disallowed;
HDD and $HDD^2$ together may be disallowed;
HDD and Log HDD together may be disallowed;
Log HDD and $HDD^2$ together may be disallowed.

Once the combinations of regression outputs for 'i'=1 to n have been generated and stored, the M&V logic 2548 may sort the $R^2$ values for the regressions (e.g., by decreasing $R^2$) and output on the display 2506 the top results (e.g., the top 1, 2, or 3 results). Each result may, for example, report the $R^2$, Significance F, intercept and coefficients for each independent variable in the top regression results. Additionally, the M&V logic 2548, may use the intercept and the coefficients for each independent variable to create the regression equation for each of the top regression outputs.

In addition to those noted above, the M&V logic 2548 may generate a wide variety of analysis results as outputs on the display 2506. Examples are given below. With regard to the first two examples, the M&V logic 2548 may generate the displays using information obtained from the balance point determination logic 2528. Alternatively or additionally, the balance point determination logic 2528 may display the charts described using the information that it obtains in its analysis to find the balance points.

1) a line chart showing temperature varying from HBPMin to HBPMax on the X axis and $R^2$ (the square of correlation for temperature and kWh) corresponding to each temperature on the Y axis;

2) a line chart showing temperature varying from CBPMin to CBPMax on the X axis and $R^2$ (the square of correlation for temperature and kWh) corresponding to each temperature on the Y axis;

3) tables containing the underlying data used to generate above two charts;

4) a table showing monthly date in any desired (e.g., mm/yyyy) format, kWh consumption, kBTU consumption, monthly CDD, monthly HDD, monthly $CDD^2$, Log CDD, Log HDD, $HDD^2$, monthly average Occupancy, monthly average Relative Humidity, monthly average Wind Speed, monthly average Global Solar Radiation, or other variables; and 5) a table which shows a summary of the top regression outputs, including $R^2$, Significance F, Regression Equation, Intercept and coefficients for each independent variable for each regression output.

Figure 5:
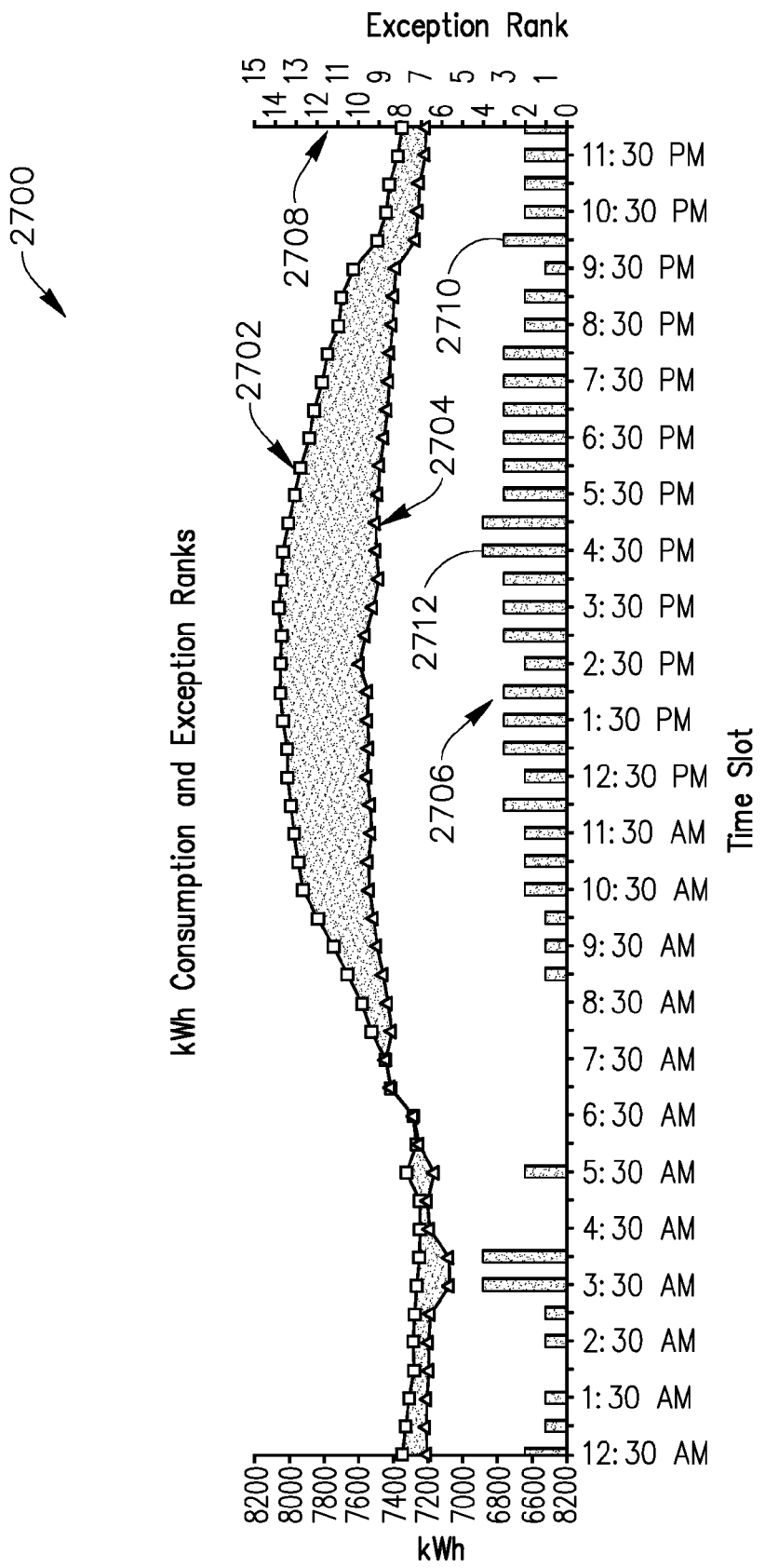
FIG. 5 shows a kilowatt hour consumption and exception ranks analysis.

The machine 2500 may additionally or alternatively include comparison logic 2544 (e.g., as one of the energy analysis programs 2524). The comparison logic 2544 may include instructions that when executed by the processor 2502 cause the processor 2502 to perform a kilowatt hour consumption and exception rank analysis, for example. One example of a comparison analysis 2700 that results from the comparison logic 2544 is shown in FIG. 5. The comparison analysis 2700 extends in 30 minute intervals over an entire day for a particular building under analysis, but the comparison logic 2544 may perform analyses over shorter or longer time periods at different intervals. Furthermore, the comparison may be done with respect to a single building (e.g., to compare energy consumption data historically for the building), or with respect to multiple buildings (e.g., to compare a building under analysis to a different control building). In addition, there may be multiple buildings in a control building group that each contribute energy data for defining (e.g., by averaging or according to another statistical treatment) the control building data described below.

The comparison logic 2544 may compare control building data 2702 to a user-defined standard 2704. In the example shown in FIG. 5, the control building data 2702 is daily average kWh consumption measured at 30 minute intervals over 15 different days in July, and the user-defined data is 2704 is daily average kWh consumption at 30 minute intervals over the month of January 2009 for a particular building under analysis. The control building data 2702 and user-defined data 2704 may be data points over any other time intervals, time spans, or obtained from any number of different buildings, or from the same building. Further, either the control building data 2702, the user-defined data 2704, or both, may capture desired or expected levels of building performance, may represent actually measured and optionally statistically treated (e.g., averaged) consumption data from one or more buildings, or may represent other data automatically obtained or input by an operator. Thus, as another example, the control building data 2702 may be individual operator specified data points at 30 minute intervals that provide a baseline for comparison. The constitution of the control building data 2702 and the user-defined data 2704 may vary widely, as examples: average consumption at any desired interval on weekdays over a pre-defined time period (e.g., one week, three months, or one year), optionally excluding holidays, and/or outlier data points; average consumption at any desired interval on weekends over a predefined time period; average consumption at any desired interval on holidays over a predefined time period; or other consumption data.

For the example shown in FIG. 5, the comparison logic 2544 performs a comparison respect to energy consumption measured in kWh. However, other energy measurements may be used, such as cubic feet of natural gas consumption, gallons of water used, or measurements of other types of energy or resources.

The comparison logic 2544 may determine and display exceptions 2706. The exceptions 2706 may identify noteworthy variations in consumption data for further review or analysis. FIG. 5 illustrates an example in which 16 exception ranks 2708 are defined. As specific examples, the exception 2710 indicates a rank 3 exception and the exception 2712 indicates a rank 4 exception. The comparison logic 2544 may analyze the building control data 2702, the user-defined data 2704, or both to determine exceptions at any desired time interval, such as every second, every minute, every 15 minutes or every 30 minutes.

The comparison logic 2544 may determine an exception rank for any interval in many different ways. For example, the exception rank may apply to the user-defined data 2704, with exception rank assigned based on the standard deviation of the user defined data 2704 (e.g., determined at each interval). Table Exception Ranks, below, shows one example definition of the exception ranks according to windows of standard deviations of the user-defined data 2704. The comparison logic 2544 may determine additional, fewer, or different exception ranks according to additional, fewer, or different standard deviation windows, or using any other statistical criteria of interest that map the statistical criteria to one or more exception ranks.

TABLE

| | Exception Ranks | | | | |
|---|---|---|---|---|---|
| Rank | 1 | 2 | 3 | 4 | 5 |
| Standard Deviations from the mean | −1 to +1 | from: −1 to −1.5 and from: 1 to 1.5 | from: −1.5 to −2 and from: 1.5 to 2 | from: −2 to −2.5 and from: 2 to 2.5 | from: −2.5 to −3 and from: 2.5 to 3 |

More specifically, the comparison logic 2544 may determine the average (the control average) and standard deviation (the control standard deviation) of the energy data for each interval (e.g., the interval between 3 am and 3:30 am on a given day) in the building control data 2702. The comparison logic 2544 further determines the average (the user-defined average) of the data for each similar interval in the user-defined data 2704. The comparison logic 2544 then assigns an exception rank to the user-defined average for each interval in the user-defined data 2704 according to where the user-defined average falls within the control standard deviation determined from the building control data 2702 for the same interval. For example, in FIG. 5, at 3:30 am the comparison logic 2544 determines an exception rank of 4 because the average consumption (7082.58 kWh) is between −2 and −2.5 standard deviations of the average consumption (7267.40) in the building control data 2702 in the same interval. At 3:30 pm, an exception rank of 3 applies because the average consumption (7526.81 kWh) of the user-defined data 2704 is between −1.5 and −2 standard deviations of the average consumption (8064.87) in the building control data 2702 in the same interval.

The Table Comparison Data, below, shows for the comparison analysis 2700 the analysis data at 30 minute intervals for the control building data 2702 and the user-specified data 2704, including the determined exception rank determined according to Table Exception Ranks.

TABLE

| | Comparison Data | | | |
|---|---|---|---|---|
| | Control Range average by time slot | User Defined Range average by time slot | Exception Rank by time slot | Difference |
| 12:30 AM | 7348.93 | 7213.00 | 2.00 | 135.93 |
| 1:00 AM | 7331.47 | 7218.42 | 1.00 | 113.05 |
| 1:30 AM | 7310.67 | 7210.65 | 1.00 | 100.02 |
| 2:00 AM | 7281.27 | 7204.10 | 0.00 | 77.17 |
| 2:30 AM | 7285.67 | 7202.52 | 1.00 | 83.15 |
| 3:00 AM | 7275.53 | 7194.45 | 1.00 | 81.08 |
| 3:30 AM | 7267.40 | 7082.58 | 4.00 | 184.82 |
| 4:00 AM | 7250.07 | 7086.48 | 4.00 | 163.58 |
| 4:30 AM | 7248.60 | 7198.90 | 0.00 | 49.70 |
| 5:00 AM | 7245.80 | 7206.10 | 0.00 | 39.70 |
| 5:30 AM | 7323.53 | 7169.90 | 2.00 | 153.63 |
| 6:00 AM | 7265.13 | 7259.00 | 0.00 | 6.13 |

TABLE-continued

Comparison Data

| | Control Range average by time slot | User Defined Range average by time slot | Exception Rank by time slot | Difference |
|---|---|---|---|---|
| 6:30 AM | 7285.67 | 7291.13 | 0.00 | −5.46 |
| 7:00 AM | 7413.67 | 7419.35 | 0.00 | −5.69 |
| 7:30 AM | 7448.87 | 7453.87 | 0.00 | −5.00 |
| 8:00 AM | 7526.47 | 7419.16 | 0.00 | 107.31 |
| 8:30 AM | 7583.80 | 7443.19 | 0.00 | 140.61 |
| 9:00 AM | 7673.47 | 7465.71 | 1.00 | 207.76 |
| 9:30 AM | 7751.73 | 7499.58 | 1.00 | 252.15 |
| 10:00 AM | 7835.53 | 7522.03 | 1.00 | 313.50 |
| 10:30 AM | 7923.40 | 7550.65 | 2.00 | 372.75 |
| 11:00 AM | 7952.73 | 7556.00 | 2.00 | 396.73 |
| 11:30 AM | 7975.87 | 7537.77 | 2.00 | 438.09 |
| 12:00 PM | 7994.87 | 7545.10 | 3.00 | 449.77 |
| 12:30 PM | 8015.13 | 7557.58 | 2.00 | 457.55 |
| 1:00 PM | 8016.80 | 7550.87 | 3.00 | 465.93 |
| 1:30 PM | 8041.73 | 7556.03 | 3.00 | 485.70 |
| 2:00 PM | 8057.87 | 7556.29 | 3.00 | 501.58 |
| 2:30 PM | 8052.53 | 7600.32 | 2.00 | 452.21 |
| 3:00 PM | 8043.93 | 7568.87 | 3.00 | 475.06 |
| 3:30 PM | 8064.87 | 7526.81 | 3.00 | 538.06 |
| 4:00 PM | 8050.93 | 7492.26 | 3.00 | 558.68 |
| 4:30 PM | 8041.73 | 7506.42 | 4.00 | 535.31 |
| 5:00 PM | 8010.40 | 7509.71 | 4.00 | 500.69 |
| 5:30 PM | 7971.53 | 7496.00 | 3.00 | 475.53 |
| 6:00 PM | 7935.40 | 7487.13 | 3.00 | 448.27 |
| 6:30 PM | 7891.13 | 7462.32 | 3.00 | 428.81 |
| 7:00 PM | 7859.20 | 7441.35 | 3.00 | 417.85 |
| 7:30 PM | 7815.40 | 7436.06 | 3.00 | 379.34 |
| 8:00 PM | 7783.07 | 7426.45 | 3.00 | 356.62 |
| 8:30 PM | 7720.87 | 7415.61 | 2.00 | 305.25 |
| 9:00 PM | 7703.20 | 7405.29 | 2.00 | 297.91 |
| 9:30 PM | 7628.07 | 7392.23 | 1.00 | 235.84 |
| 10:00 PM | 7492.53 | 7280.90 | 3.00 | 211.63 |
| 10:30 PM | 7442.33 | 7267.32 | 2.00 | 175.01 |
| 11:00 PM | 7423.47 | 7257.65 | 2.00 | 165.82 |
| 11:30 PM | 7371.53 | 7224.42 | 2.00 | 147.11 |
| 12:00 AM | 7349.53 | 7219.74 | 2.00 | 129.79 |
| Total KWH | 367583.33 | 354587.29 | 3.00 | 12996.04 |

Figure 6:
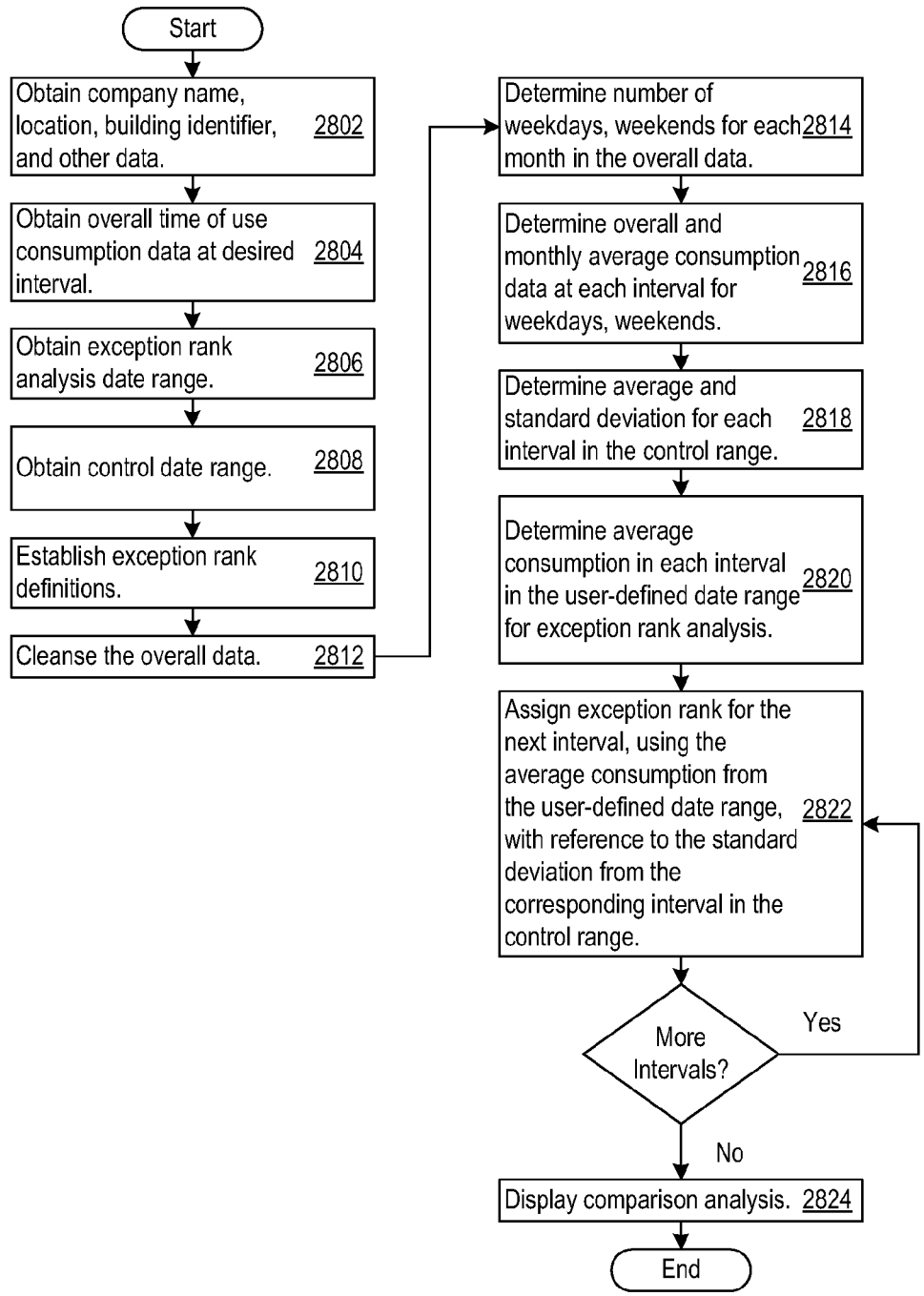
FIG. 6 shows comparison logic for determining exception ranks.

FIG. 6 shows the logic that the comparison logic 2544 may implement, e.g., as processor executable instructions (i.e., as a computer implemented method). The comparison logic 2544 obtains background information, such as company name, building and company location, an (optionally) unique building identifier, or other data (2802). The comparison logic 2544 gathers overall time of use consumption data at any desired interval (e.g., every 30 minutes) (2804). The operator may specify a date range for exception rank analysis (2806) and for the control range (2808). For example, the operator may specify a particular month in 2006 as the control range, and a particular month in 2010 as the date range for exception rank analysis. Optionally, the operator may directly specify the consumption data for either the control range or exception rank analysis range.

The comparison logic 2544 obtains or establishes exception rank definitions (2810). Examples of exception rank definitions are shown in Table: Exception Ranks, but the definitions may vary widely in implementation to take into consideration any statistical parameter desired. The comparison logic 2544 optionally cleanses any of the input consumption data (2812). To that end, the comparison logic 2544 may remove data rows for which no consumption data is available, for which erroneous data is present, or for which the consumption data is anomalous (e.g., exceeding the mean consumption data by more than a pre-defined threshold).

The exception analysis may be run against all the data, weekdays, weekends, holidays, or any other subset of the overall data. Thus, the comparison logic 2544 identifies and determines the number of weekdays, weekends, holidays, or other particular days in the overall data (2814). Similarly, the comparison logic 2544 determines overall and monthly average consumption data at each interval for weekdays, weekends, holiday, and all days in each month (2816).

For each interval in the control range (e.g., daily, every 30 minutes), the comparison logic 2544 determines the average and standard deviation of the data for that interval (2818). Similarly, the comparison logic 2544 determines the average consumption in each interval in the user-defined date range for the exception rank analysis (2820). The comparison logic 2544, with reference to the exception rank definitions, assigns an exception rank for each interval, using the average consumption from the user-defined date range with reference to the average and standard deviation determined form the corresponding interval in the control range (2822). The comparison logic 2544 may generate and display the resulting comparison analysis 2700 (2824). While FIG. 5 shows an analysis of daily consumption at 30 minute intervals, the comparison logic 2544 may analyze other time windows at other intervals (e.g., one day intervals over one month, or one day intervals over one year).

Exception ranks may be determined in ways other than that described above, however. As another example, the comparison logic 2544 may determine the exception rank according to the magnitude of the difference in consumption between the control building data 2702 and the user-defined data 2704, with individual thresholds or ranges defined to determine which difference magnitude maps to which exception rank. Furthermore, the difference may be shaded or otherwise highlighted in the comparison analysis 2700 to help visualize the difference.

The machine 2500 may employ the comparison analysis 2700 to rank or gauge how well a building is performing. The ranking may be output on the display 2506 as an analysis result. For example, a building with more than a threshold number of exceptions of greater than a pre-defined exception rank (or some other function of the exception ranks) may be flagged and displayed as a building that needs special attention with regard to its energy consumption. To that end, the comparison logic 2544 may implement any desired ranking rules based on the comparison analysis 2700 to determine how well a building is performing, and responsively take action, e.g., by notifying a building supervisor, outputting notification or warning messages on the display 2506, or taking other action when the rule fires.

Figure 7:
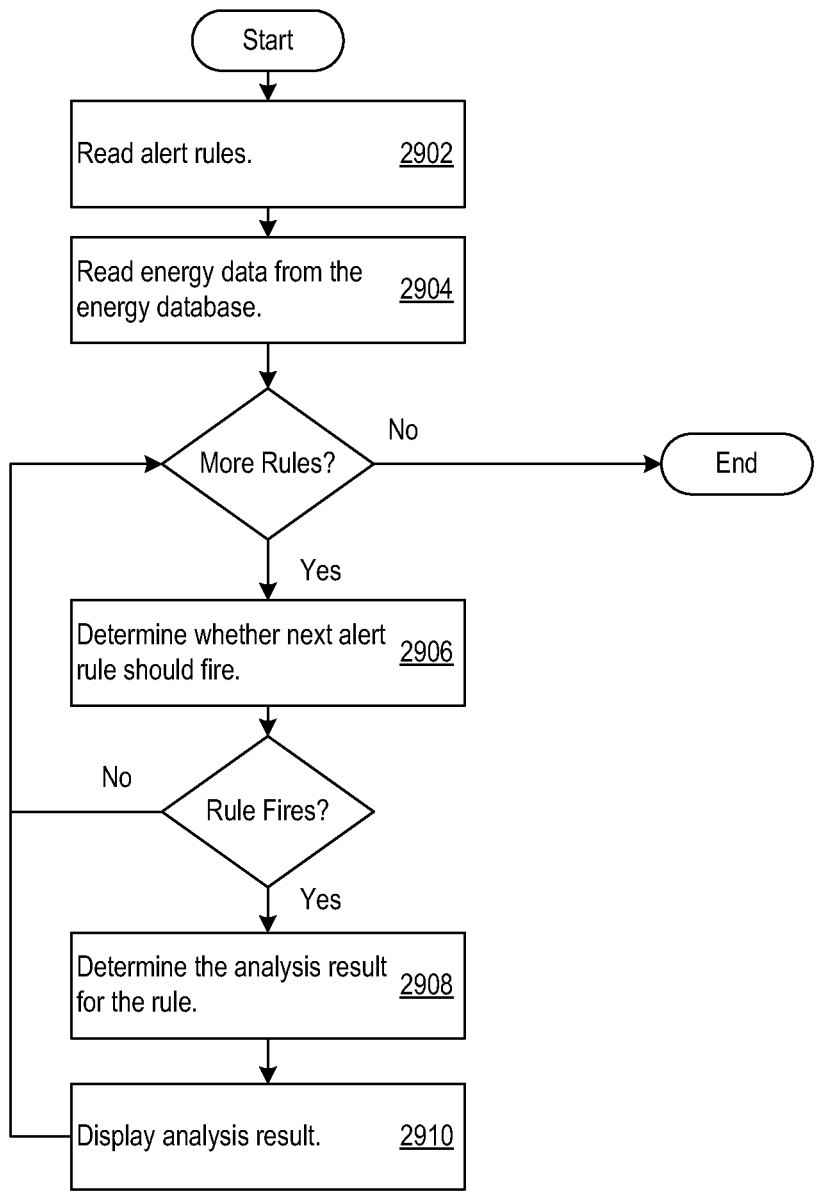
FIG. 7 shows alert logic for determining building level alerts.

In addition, the machine 2500 may implement building level alerts. The alerts may be defined in the memory 2504 using alert rules 2536. Alert logic 2538, shown in FIG. 7, may run at any desired interval. The alert logic 2538 may include instructions that when executed by the processor 2502, read the alert rules 2536 (2902) and energy data from the energy database 2514 (2904). The instructions may further processes the alert rules 2536 to determine based on any of the energy data whether any of the alert rules 2536 should fire (2906). If so, the alert logic 2538 determines the analysis result (2908) based on the alert rule and displays the analysis result (2910). In that regard, the machine 2500 may output a message, display any desired indicia, or take any other pre-defined action when the alert rule fires, as defined in each alert rule 2536. Further, the alert rules 2536 may specify the analysis result (e.g., display a warning message), the analysis results may be pre-determined (e.g., for any rule that fires, send a message to an operator), or the analysis results may be determined in other ways. The alert rules 2536 may vary widely in implementation, and may take into consideration any of the variables obtained from the building or any other source, such as kWh consumption, temperature, time, date, balance points, or other variables. Examples of alert rules 2536 are shown below in Table: Alerts.

TABLE

| | | Alerts | |
|---|---|---|---|
| Alert Category | Alert Name | Alert Rule | Notes |
| Demand kilowatts (kw) | 1. Demand Exceeded Peak Threshold | Building kw demand compared at any desired interval against a user defined kw threshold. | Example: If kw demand reaches over 500 kw, then issue alert. |
| | 2. Demand Exceeded Historic Threshold (not normalized) | Building kw demand continuously or at any desired interval (e.g., daily, monthly) compared against historical demand for the building. Analysis Result: Send warning message to building operator. | Example: Daily kw demand is compared to the same day in previous years. Issue alert if demand is greater or less than historical demand by a pre-selected threshold. |
| | 3. Demand Exceeded Baseline Threshold (normalized) | Building kw demand is continuously or at any desired interval (e.g., daily, monthly) compared against historical baseline regression model | Example: Daily kw demand is compared to the same or a similar day (as defined by any desired regression on variables such as HDD, CDD, Humidity, Occupancy, or other variables). |
| | 4. Significant Change (Increase or Decrease) in Demand | Building kw demand is monitored continuously or at any desired interval for changes up or down that exceed a pre-defined threshold. | Example: Demand goes from 700 kw at 10 am to 500 kw 10:15 (the next interval). This could either be a result of a demand/response event or some problem with equipment or behavior changes. |
| | 5. Demand Exceeded Comparable Building Threshold | Building kw demand is continuously or at any desired interval compared against a user-defined comparable/similar building. | Example: Building 1 demand exceeds Building 7 kw demand (Building 7 is the baseline or control building against which other buildings are compared). |
| Consumption (kwh) | 1. Consumption Exceeded Historic Threshold (not normalized) | Building kwh consumption at any desired interval (e.g., hourly, daily, monthly) compared against historical consumption for the building. | Example: Daily kwh consumption is compared to the same day in previous years. Issue alert if consumption is greater or less than historical consumption by a pre-selected threshold. |
| 2. Consumption Exceeded Baseline Threshold (normalized) | Building kwh consumption is compared at any desired interval (e.g., daily, monthly) against historical baseline regression model | Example: Daily kwh consumption is compared to the same or a similar day (as defined by regression variables such as HDD, CDD, Humidity, Occupancy, or other variables). |
| 3. Significant Change (Increase or Decrease) in Consumption | Building kwh consumption is monitored at any desired interval for changes up or down that exceed a pre-defined threshold. | Example: Consumption goes from 900 kwh between 10 am and 11 am to 500 kwh 11 am between and 12 noon. This could either be a result of a demand/response event or some problem with equipment or behavior changes. |
| 4. Consumption Exceeded Comparable Building Threshold | Building kwh consumption is compared at any desired interval against a user-defined comparable/similar building. | Example: Building 1 consumption exceeds Building 7 kwh consumption (Building 7 is the baseline or control building against which other buildings are compared). |

The alerts discussed above are building level alerts with regard to consumption and demand. However, the alert rules may define alerts based on any energy consumption parameters that are directly measured, statistically derived, or otherwise obtained. The machine 2500 may also implement more complex analyses. As one example, the machine 2500 may include event logic 2542 that analyzes equipment data to detect or infer events of interest based on event rules 2540. Such event rules 2540 may help define when demand/response events occur, when equipment has failed or has been fixed, or other events. When the event logic 2542 identifies an event, the event logic 2542 may responsively execute a pre-defined action, for example as specified in the event rules 2540.

The machine 2500 or any of the systems described above may be implemented with additional, different, or fewer components. As one example, a processor may be implemented as a microprocessor, a microcontroller, a DSP, an application specific integrated circuit (ASIC), discrete logic, or a combination of other types of circuits or logic. As another example, memories may be DRAM, SRAM, Flash or any other type of memory. The processing capability of the system may be distributed among multiple components, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms.

Logic, such as programs or circuitry, may be combined or split among multiple programs, distributed across several memories and processors, and may be implemented in a library, such as a shared library (e.g., a dynamic link library (DLL)). The DLL, for example, may store code that analyzes energy expenditure or that prepares energy reports. As another example, the DLL may itself provide all or some of the functionality of the machine 2500. The programs may be stored on a computer readable medium, such as a CDROM, hard drive, floppy disk, flash memory, or other computer readable medium. Thus, a computer program product may include computer readable instructions, which when loaded and run in a computer and/or computer network system, cause the computer system and/or the computer network system to perform operations according to any of the claims below, and in particular to perform any of the logic and methods illustrated in FIGS. 4, 6, and 7, as examples.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method for energy analysis comprising:
    establishing, by a processor, a data connection from a network operations center through an energy data connectivity interface to an energy data source;
    obtaining, by a processor, energy data at the network operations center through the data connection to the energy data source;
    performing, by the processor, an energy analysis in the network operations center on the energy data to produce an analysis result, where performing the energy analysis comprises:
    determining, by the processor, a balance point set from the energy data as the analysis result, the balance point set comprising a heating balance point and a cooling balance point, wherein the heating balance point is a temperature above which a building is not heated and the cooling balance point is a temperature below which the building is not cooled; and
    generating and displaying, by the processor, a user interface on a display, the user interface including the analysis result.

2. The method of claim 1, where determining a balance point set comprises:
    determining both of a heating balance point search window into the energy data and a cooling balance point search window into the energy data.

3. The method of claim 2, where determining a balance point set comprises:
    executing either or both of a correlation analysis of the energy data within the heating balance point window and a correlation analysis of the energy data within the cooling balance point window.

4. The method of claim 3, where executing the correlation analysis comprises:
    executing a correlation analysis between temperature and energy consumption to find a best fit correlation by performing a linear regression using the least squares method, with 'n' independent variables and one dependent variable.

5. The method of claim 3, where executing the correlation analysis comprises:
    executing the correlation analysis at each step of a pre-selected temperature delta through both of the heating balance point window and the cooling balance point window.

6. An energy analysis system comprising: a processor; and a memory coupled to the processor, the memory comprising:
    energy analysis logic that, when executed by the processor, causes an energy analysis system to:
    establish a data connection from a network operations center through an energy data connectivity interface to an energy data source;
    obtain energy data at the network operations center through the data connection to the energy data source;
    perform an energy analysis in the network operations center on the energy data to produce an analysis result, where the energy analysis comprises:
    determining a balance point set from the energy data as the analysis result, the balance point set comprising a heating balance point and a cooling balance point, wherein the heating balance point is a temperature above which a building is not heated and the cooling balance point is a temperature below which the building is not cooled; and
    generate and display a user interface on a display, the user interface including the analysis result.

7. The system of claim 6, where the energy analysis logic further causes the energy analysis system to obtain either or both of a heating balance point search window and a cooling balance point search window.

8. The system of claim 7, where the energy analysis logic further causes the energy analysis system to:
    execute either or both of a correlation analysis of the energy data within the heating balance point window and a correlation analysis of the energy data within the cooling balance point window.

9. The system of claim 8, where the energy analysis logic further causes the energy analysis system to:
    execute a correlation analysis between temperature and energy consumption to find a best fit correlation by performing a linear regression using the least squares method, with 'n' independent variables and one dependent variable.

10. The system of claim 8, where the energy analysis logic further causes the energy analysis system to:
    execute the correlation analysis at each step of a pre-selected temperature delta through either or both of the heating balance point window and the cooling balance point window.

11. A method for energy analysis comprising:
    establishing, by a processor, a data connection from a network operations center through an energy data connectivity interface to an energy data source;
    obtaining, by the processor, energy data at the network operations center through the data connection to the energy data source;
    performing, by the processor, an energy analysis in the network operations center on the energy data to produce an analysis result, where performing the energy analysis comprises:
    determining, by the processor, a heating balance point and a cooling balance point, wherein the heating balance point is a temperature above which a building is not heated and the cooling balance point is a temperature below which the building is not cooled;

determining, by the processor, building comparison baseline data within the energy data;

determining, by the processor, actual consumption data within the energy data;

determining, by the processor, as the analysis result, an exception rank by;

determining, by the processor, a comparison standard deviation of the energy data within a time interval in the building comparison baseline data; and comparing, by the processor, the comparison standard deviation data and the actual consumption, the exception rank identifying specific data in the actual consumption for further review; and generating and displaying, by the processor, a user interface on a display, the user interface including the analysis result.

12. The method of claim 11, where determining an exception rank comprises:

determining a comparison average of the energy data within the time interval in the building comparison baseline data.

13. The method of claim 12, where determining an exception rank further comprises:

determining an actual consumption average of the energy data within the time interval in the actual consumption data.

14. The method of claim 13, where determining an exception rank further comprises:

accessing an exception rank definition that comprises a mapping of a statistical parameter to exception ranks; and assigning the exception rank to the time interval according to the mapping.

15. The method of claim 14, where the statistical parameter comprises a standard deviation window with respect to the comparison average.

16. An energy analysis system comprising:

a processor; and a memory coupled to the processor, the memory comprising:

energy analysis logic that, when executed by the processor, causes an energy analysis system to:

establish a data connection from a network operations center through an energy data connectivity interface to an energy data source;

obtain energy data at the network operations center through the data connection to the energy data source;

perform an energy analysis in the network operations center on the energy data to produce an analysis result, where the energy analysis comprises:

determining a heating balance point and a cooling balance point, wherein the heating balance point is a temperature above which a building is not heated and the cooling balance point is a temperature below which the building is not cooled;

determining building comparison baseline data within the energy data;

determining actual consumption data within the energy data;

determining, as the analysis result, an exception rank by;

determining a comparison standard deviation of the energy data within a time interval in the building comparison baseline data; and comparing the comparison standard deviation data and the actual consumption data, the exception rank identifying specific data in the actual consumption data for further review; and generate and display a user interface on a display, the user interface including the analysis result.

17. The system of claim 16, where the energy analysis logic further causes the energy analysis system to:

determine a comparison average of the energy data within the time interval in the building comparison baseline data.

18. The system of claim 17, where the energy analysis logic further causes the energy analysis system to:

determine an actual consumption average of the energy data within the time interval in the actual consumption data.

19. The system of claim 18, where the energy analysis logic further causes the energy analysis system to:

access an exception rank definition that comprises a mapping of a statistical parameter to exception ranks; and assign an exception rank to the time interval according to the mapping.

20. The method of claim 19, where the statistical parameter comprises a standard deviation window with respect to the comparison average.

* * * * *